April 6, 1965  G. W. GOODWIN  3,177,018
SNAP RING COUPLING
Filed Jan. 2, 1963

INVENTOR
GORDON W. GOODWIN
BY
ATTORNEY

United States Patent Office 3,177,018
Patented Apr. 6, 1965

3,177,018
SNAP RING COUPLING
Gordon W. Goodwin, Jackson, Mich., assignor to
Aeroquip Corporation, Jackson, Mich.
Filed Jan. 2, 1963, Ser. No. 248,966
6 Claims. (Cl. 285—277)

The invention pertains to a fluid coupling and particularly relates to an easily connectible and disconnectible coupling of economical manufacture.

The invention pertains to an economical coupling which may be utilized in relatively low pressure fluid systems such as those employed in industrial compressed air and water applications. Previous couplings of this type, which may be easily connected and disconnected, are relatively expensive to manufacture and normally employ a number of components machined to close tolerances.

It is a basic object of the invention to provide a fluid system quick-acting coupling of economical manufacture wherein stampings and swaging operations may be employed to reduce the cost of manufacture.

A further object of the invention is to provide a readily connectible and disconnectible coupling employing a radially expansible locking member wherein a positive locking action is provided and the likelihood of malfunctioning of the locking member is substantially eliminated.

Another object of the invention is to provide a fluid system coupling employing a two-part body member wherein the assembly of the body members may be accomplished by a swaging operation, and permits the assembly of a seal within the body member before completion of the swaging operation.

Yet a further object of the invention is to provide a fluid system coupling of the quick-connect and disconnect type wherein axial tension forces placed upon the coupling will not accidentally separate the coupling body members.

Another object of the invention is to provide a fluid system coupling having body members which may be separated by axial displacement of a locking member in the direction counter to relative movement of the male body member during disconnection.

An additional object of the invention is to provide a female body member coupling of low cost which may be employed with many conventional male body members currently available and in use.

Figure 1:
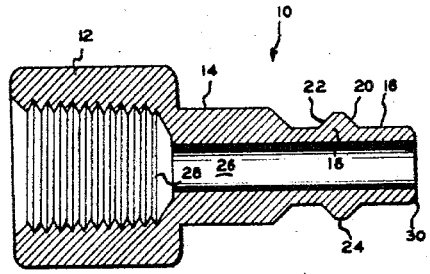
Figure 2:
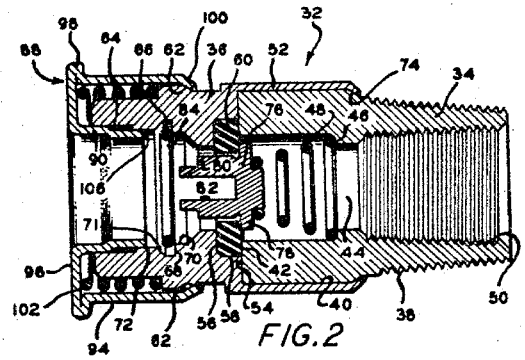
Figure 4:
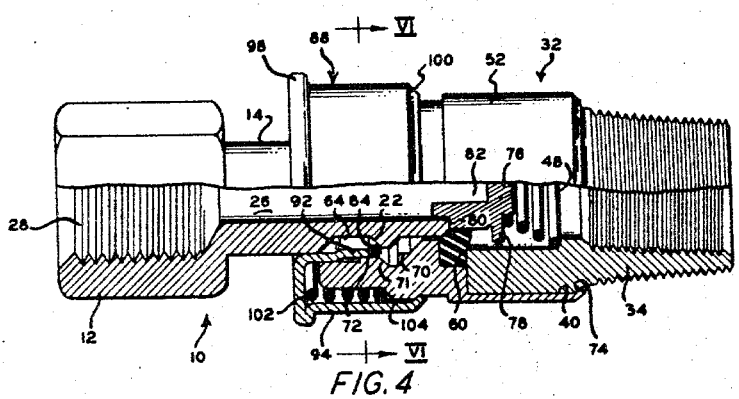
Figure 3:
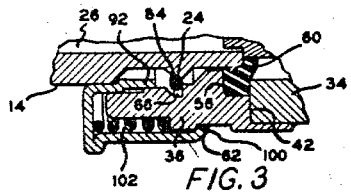
Figure 5:
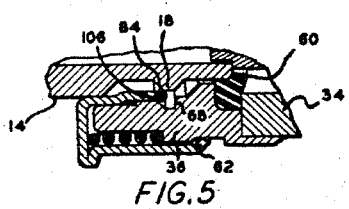
Figure 6:
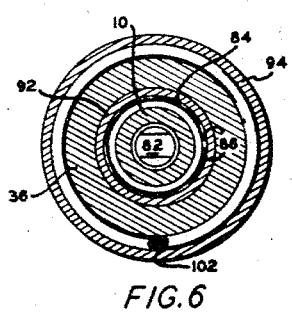

These and other objects of the invention arising from the relationships and details of the components of an embodiment thereof will be apparent from the following description and accompanying drawings wherein:

FIG. 1 is an elevational, sectional view of the male member of a coupling in accord with the invention, FIG. 2 is an elevational, sectional view of the female body member of a coupling in accord with the invention, FIG. 3 is a detailed, elevational, sectional view of the locking means and valve seat of the body members during connection thereof, FIG. 4 is an elevational, partly sectioned view of the body members of the coupling in accord with the invention upon complete interconnection of the body members illustrating the relationships thereof during full fluid flow, FIG. 5 is an elevational, sectional, detailed view of the coupling locking means during disconnection thereof immediately prior to release of the locking ring, and FIG. 6 is an elevational, sectional view taken along section VI—VI of FIG. 4.

FIG. 1 illustrates the cross-sectional axial configuration of the coupling male body member 10 of a conventional construction. The exterior configuration of the body member 10 includes an enlarged portion 12 having wrench-receiving hexagonally related flats defined thereon. A central cylindrical surface 14 and a cylindrical nose surface 16 are also defined on member 10. An annular radially extending projection or head 18 arises from surface 16 and includes a forward conical surface 20, a rear conical surface 22, and an outer cylindrical surface 24. A bore 26 is defined within the male body member 10 and intersects the inner end of the body at one end and opens into a threaded portion 28 at the other end. The threads 28 permit the male body member to be threadedly attached to a hose, conduit or other component of the fluid system. As will be apparent from the drawings, the inner end of the body member 10 intersects the hose surface 16 at a radius 30.

The female body member 32 of the coupling is shown in this disconnected state in FIG. 2, and is constructed of two tubular parts 34 and 36, respectively. The part 34 is exteriorly provided with conical threads 38 and a cylindrical surface 40. The left end of the part 34 is defined by radial end surface 42 which intersects surface 40. Internally, part 34 is provided with a bore 44 which includes a radially extending annular shoulder 46 against which a spring 48 may bear. Also, the bore may be internally threaded as at 50 whereby the threads 38 and 50 permit either internally or externally threaded fluid system components to be employed with the female body member.

The body member part 36 includes an annular thin wall section 52 having an inner diameter adapted to receive the surface 40 of the body member part 34. The body member part 36 also includes radially extending shoulders 54 and 56 intersecting an axial step 58 which receives the annular resilient sealing ring 60. The axial length of the step 58 is preferably slightly less than the noncompressed axial dimension of the ring 60 whereby engagement of the surfaces 42 and 54 will slightly compress the ring between surfaces 42 and 56 and firmly assemble the ring within the female body member. An annular exterior shoulder 62 is defined upon the body member part 36 for cooperation with a locking sleeve, as will be later described.

Body member part 36 is internally provided with a bore 64 including a recess 66 of annular concentric configuration. The recess 66 includes a radially disposed shoulder 68 having a minimum diameter defined by the intersection with the surface 70. The bore 64 includes a cylindrical concentric backup or locking surface 72 intermediate the recess 66 and the bore open end. The side 71 of the recess 66 nearest the bore open end is of a conical configuration tapering toward the open end and intersects surface 72.

After the valve seal ring 60 has been located in the step 58, the end of part 34 defined by surface 40 is inserted into the thin wall portion 52 to engage the seal ring member and surface 54. Thereupon, swaging of the portion 52 upon surface 40 and bending the right end of the thin wall section 52 over the shoulder 74 will firmly interconnect body portions 34 and 36. Such a connection will be fluid tight in that the ring 60 functions as a seal to prevent leakage between the engaging surfaces of the body member.

A valve member 76 is received within the bore 44 and includes an annular lip 78 which cooperates with the ring 60 to seal the bore against fluid flow thereto. The spring 48 engages the valve and biases the valve to the left, as shown in FIG. 2, into engagement with the ring 60. The valve is provided with a male body member abutment surface 80, and is diametrically slotted at 82 to permit the passage of the fluid around the valve after the valve has been unseated from the ring.

The locking means for maintaining the body members 10 and 32 in connected relationship includes an annular split ring 84 of steel or other metal having a normal O.D. substantially equal to or slightly less than the diameter of the locking surface 72. The normal I.D. diameter of the ring 84 will be less than the diameter of the male body member projection surface 24. It will also be noted that the minimum diameter of the shoulder 68 is less than the diameter of the locking surface 72 and ring O.D. whereby the ring 84 will engage the shoulder 68 even before radial expansion of the ring takes place. The ring 84 includes ends 86, FIG. 6, which are not welded or otherwise attached so that the ring may radially expand during connection of the body members, as will be further described.

An annular sleeve 88 is mounted upon the body member 32 and is of a U-configuration, having an inner leg portion 90 extending into the open end of the bore 64. A portion 92 of the leg portion 90 is offset radially inwardly whereby the outer diameter of the portion 92 will be slightly less than the diameter of the locking surface 72. The outer leg 94 of the sleeve 88 extends from the base portion 96, and is formed thereon whereby a radially extending lip 98 is produced. The lip 98 aids in the manipulation of the sleeve. The outer end 100 of the leg 94 is deformed inwardly by a swaging or similar operation whereby the end 100 will engage the shoulder 62 upon the sleeve being biased to the left by the spring 102 interposed between the shoulder 104 and the sleeve base portion 96. The end of the inner leg portion 90 constitutes a radial abutment surface 106 and will normally be axially located relative to the locking surface 72 as shown in FIG. 2.

To connect the body members 10 and 32 in a fluid transmitting relationship, the body members are axially aligned and the male body member surface 16 is inserted into the open end of the bore 64. Insertion of the male body member into the bore 64 continues unhindered until the right end of the body member 10 engages the valve abutment surface 80. Thereupon, further axial movement of the body member 10 into the bore 64 displaces the valve 76 from the ring 60, and permits fluid flow through the coupling. Very shortly after the valve 76 unseats, the nose radius 30 engages the ring 60 and is partially inserted through the central opening of the ring. Shortly after the nose surface 30 engages the ring 60, the forward conical surface 20 of the projection 18 will engage the split ring 84 and axially translate the ring into engagement with the shoulder 68, if the ring is not already engaging this surface. Further axial movement of the body members causes the projection 18 to radially expand the ring 84 into the recess 66, as axial ring movement is prevented by shoulder 68 and, as shown in FIG. 3, maximum expansion of the ring 84 occurs as the ring rides over the projection's cylindrical surface 24. The body members connecting movement is continued until the ring 84 becomes axially aligned with the rear projection surface 22. At that time, the resilient nature of the ring material will cause the ring 84 to contract upon the surface 22.

After the projection 18 has passed the ring 84, the operator may release the body members and due to the action of the spring 48 and the fluid pressure within the body members, the body members will tend to separate from each other. Such separation causes the rear projection surface 22 to axially translate the ring 84 to the left, FIG. 4, moving the ring upon the cylindrical locking surface 72 and into engagement with the sleeve abutment surface face end 106. As further axial movement of the ring 84 to the left is prevented by the abutment surface 106, and radial expansion of the ring is prevented by the cylindrical locking surface 72, a positive locking interconnection of the body members 10 and 32 is achieved. It will be noted from FIG. 4 that during this complete connection relationship of the body members that the nose of the male abutment member will be in sealing relation with the ring 60, and the valve 76 will be held in a fully open position.

Axial forces imposed upon the body members 10 and 32 in a direction tending to separate the body members only tightens the locking connection between the body members in that such action tends to radially expand the ring 84 and force the ring into a more intimate engagement with the abutment surface 106. As the ring cannot move axially to the left or radially expand, such axial forces applied to the coupling body members will not accidentally cause disconnection.

To disconnect the body members, the operator grasps the sleeve 88, usually by the lip 98, and moves the sleeve toward the right, FIG. 4. Such action compresses the spring 102 and pushes the ring 84 and the male body member 10 to the right relative to the body member 32. The ring 84 will maintain the locking connection with the male body member as long as the ring is axially aligned with the locking surface 72. However, upon the ring reaching the position illustrated in FIG. 5, where the ring 84 becomes substantially aligned with the surface 71 of the recessed portion, slight additional axial movement of the ring to the right from this illustrated position permits the conical surface 22 to radially expand the ring into the recess 66, permitting the projection 18 to pass through the ring and, thus, release the male body member from the female body member.

The sleeve 88 may be constructed of sheet metal material, and as the female body member parts 34 and 36 may be assembled by an inexpensive swaging operation, it will be appreciated that the cost of manufacturing the components of the disclosed coupling will be considerably less than that of couplings employing all machined parts and wherein threaded connections are employed to assemble two-piece body members. No milling operations are required in the production of the coupling components, and only turning operations which may be readily accomplished on high speed automatic machines need be employed in the manufacture of the majority of the coupling components.

The annular resilient seal ring 60 serves a three-fold purpose. The ring 60 serves as a seal to prevent fluid leakage through the swaged connection of the female body member parts 34 and 36. Also, the annular ring 60 serves as a valve seat for cooperation with the valve 76 to prevent fluid flow through the female body member and, during connection of the body members, the ring 60 serves as the sealing means between the body members, and prevents leakage of the fluid from the connected coupling. Thus, the coupling need employ only one resilient sealing member to obtain satisfactory sealing.

It is understood that various modifications to the disclosed embodiment of the invention may be apparent to those skilled in the art without departing from the spirit and scope thereof. For instance, the readily expansible split ring could be replaced with other types of radially expansible annular means which would function in a similar manner, and it is intended that the invention be defined only by the scope of the following claims.

1. A conduit end fitting comprising, in combination,
   (a) a body member having a bore defined therein having an open end,
   (b) an annular recess defined within said body member intersecting said bore and concentric thereto,
   (c) a cylindrical locking surface defined in said bore adjacent said recess and axially located between said recess and said open end, said recess having a greater diameter than said surface,
   (d) a radially expansible ring within said bore,
   (e) first and second means within said bore confining axial movement of said ring within said bore, said first means axially aligning said ring within said recess and said second means aligning said ring with said locking surface, and
   (f) means within said bore adapted to selectively shift said ring from axial alignment with said locking surface to axial alignment with said recess.

2. A conduit end fitting comprising, in combination,
(a) a body member having a bore defined therein having an open end,
(b) said bore including an annular recessed portion axially spaced from said body member open end,
(c) a cylindrical locking surface defined in said bore adjacent said recessed portion and located intermediate said portion and said open end, said recessed portion having a greater diameter than said locking surface,
(d) a radially expansible ring within said bore having a normal outer diameter approximately equal to that of said locking surface and axially movable within said bore between alignment with said locking surface and alignment with said recessed portion,
(e) abutment means within said bore limiting axial movement of said ring to a first position aligning said ring with said recessed portion and a second position aligning said ring with said locking surface, and
(f) ring actuating means selectively axially shifting said ring from said second position to said first position.

3. A conduit coupling comprising, in combination,
(a) a female body member having a bore defined therein and having an open end,
(b) said bore including an annular recessed portion axially spaced from said body member open end,
(c) a cylindrical locking surface defined in said bore adjacent said recessed portion and located intermediate said portion and said open end, said recessed portion having a greater diameter than said locking surface,
(d) a radially expansible ring within said bore having a normal outer diameter approximately equal to that of said locking surface and axially movable within said bore between axial alignment with said recessed portion and axial alignment with said locking surface,
(e) first and second abutment means within said bore adapted to engage and locate said ring at a first position in alignment with said recessed portion and a second position in alignment with said locking surface, respectively,
(f) means adapted to move said second abutment toward said recessed portion,
(g) a male body member having a bore defined therein adapted to be received within said female body member bore,
(h) a bulbous head defined on said male body member having a forward portion and a rearward portion and of a maximum diameter less than the diameter of said locking surface and greater than the internal normal diameter of said ring, said head forward portion engaging said ring upon insertion of said male body member into the bore of said female body member and translating said ring into engagement with said first abutment means, said head expanding said ring into said recessed portion and passing into said female body member bore until said head rearward portion aligns with said ring permitting said ring to contract to its normal diameter whereby withdrawal of said male body member from said female body member is prevented by said ring engagement with said second abutment means, and radial expansion of said ring by said head is prevented by said locking surface.

4. A conduit end fitting comprising, in combination,
(a) a body member having a bore defined therein having an open end,
(b) said bore including an annular recessed portion concentrically related to said bore and a radial shoulder adjacent said recessed portion, said recessed portion being located intermediate said open end and said shoulder,
(c) a cylindrical locking surface concentrically defined within said bore adjacent said recessed portion intermediate said recessed portion and said open end, having a diameter greater than the minimum diametrical dimension of said shoulder,
(d) a radially expansible ring within said bore having a normal outer diameter approximately equal to the diameter of said locking surface and greater than the minimum diametrical dimension of said shoulder,
(e) an exteriorly accessible sleeve carried by said body member having a portion received within said bore and defining a ring-engaging abutment adjacent said locking surface,
(f) means mounting said sleeve on said body member permitting movement thereon in a direction parallel to said bore whereby said sleeve abutment may be moved toward said recessed portion to axially align said ring with said recessed portion,
(g) said sleeve portion within said bore having a minimum diameter greater than the inner diameter of said ring, and
(h) biasing means biasing said sleeve portion within said bore away from said recessed portion.

5. In a conduit end fitting as in claim 4, wherein
(a) an annular recess is defined on the exterior of said body member having a shoulder surface,
(b) said sleeve being of an annular configuration having a U-cross-sectional configuration wherein one of the legs of the sleeve comprises the bore-received sleeve portion and the other of said legs encompasses the portion of said body member adjacent said open end, the terminal end of said other leg being deformed into said body member exterior recess for engagement with said shoulder surface to limit movement of said sleeve due to said biasing means.

6. A conduit end fitting comprising, in combination,
(a) a body member having a bore defined therein having an open end,
(b) a recess defined within said body member intersecting said bore and concentric thereto,
(c) a cylindrical locking surface defined in said bore adjacent said recess and axially located between said recess and said open end, said recess defined by a surface having a greater radial dimension than said locking surface,
(d) a radially expansible split ring within said bore,
(e) first and second means within said bore restricting axial movement of said ring within said bore, said first means axially aligning said ring within said recess and said second means aligning said ring with said locking surface, and
(f) means within said bore adapted to selectively shift said ring from axial alignment with said locking surface to axial alignment with said recess.

References Cited by the Examiner
UNITED STATES PATENTS

| 2,225,610 | 12/40 | Christian | 285—277 |
| 2,299,643 | 10/42 | Moody | 285—321 X |
| 2,457,052 | 12/48 | LeClair | 251—149.6 X |

FOREIGN PATENTS

| 829,531 | 3/60 | Great Britain. |

M. CARY NELSON, *Primary Examiner.*